United States Patent
Araradian et al.

(10) Patent No.: US 8,121,586 B2
(45) Date of Patent: Feb. 21, 2012

(54) SYSTEMS AND METHODS FOR VOICE BASED SEARCH

(75) Inventors: Araz Araradian, Glendale, CA (US); Arbind Thakur, Santa Monica, CA (US); Benson Tang, Irvine, CA (US)

(73) Assignee: Yellowpages.com LLC, Glendale, CA (US)

(*) Notice: Subject to any disclaimer, the term of this patent is extended or adjusted under 35 U.S.C. 154(b) by 576 days.

(21) Appl. No.: 12/211,365

(22) Filed: Sep. 16, 2008

(65) Prior Publication Data

US 2010/0069123 A1    Mar. 18, 2010

(51) Int. Cl.
*H04M 3/00* (2006.01)

(52) U.S. Cl. .............. 455/418; 455/550.1; 455/556.1; 345/173

(58) Field of Classification Search .......... 455/418, 455/550.1, 556.1; 345/173
See application file for complete search history.

(56) References Cited

U.S. PATENT DOCUMENTS

| | | | |
|---|---|---|---|
| 7,365,736 B2 | 4/2008 | Marvit et al. | |
| 7,409,349 B2 | 8/2008 | Wang et al. | |
| 2007/0176898 A1* | 8/2007 | Suh | 345/158 |
| 2008/0242343 A1* | 10/2008 | Koh et al. | 455/550.1 |
| 2009/0209293 A1* | 8/2009 | Louch | 455/566 |

OTHER PUBLICATIONS

Bruni, Frank, "Where to Eat? Ask Your iPhone," The New York Times, Jul. 16, 2008.
Wikimedia Foundation, Inc., "Etch A Sketch," located at http://en.wikipedia.org/wiki/Etch_A_Sketch, Aug. 10, 2008.

* cited by examiner

*Primary Examiner* — Danh Le
(74) *Attorney, Agent, or Firm* — Greenberg Traurig, LLP

(57) ABSTRACT

Systems and methods are provided to facilitate voice-based search of information. For example, a portable device may be in a first orientation to present a display of a graphical user interface, such as a search interface presented within a web browser of the portable device. When the portable device is in a second orientation different from the first orientation, the portable device records a voice input for the graphical user interface. When the portable device is back to the first orientation, the portable device applies the voice input to the graphical user interface. When the user shakes the portable device, the portable device re-initializes the graphical user interface for a subsequent input.

15 Claims, 8 Drawing Sheets

SYSTEMS AND METHODS FOR VOICE BASED SEARCH

FIELD OF THE TECHNOLOGY

At least some embodiments of the disclosure relate to user interface in general and, more particularly but not limited to, user interface to submit search requests.

BACKGROUND

Some portable devices, such as cellular phones and music players, have the capabilities of data communications, such as Internet access through wireless wide area networks over cellular telecommunication networks, or through wireless local area networks. For example, a portable device may have web browsers to display web pages and thus allow users to perform searches via various search engines accessible through the web browsers.

Some portable devices have keyboards to receive input from the user. The keyboards may include a set of hardware buttons arranged in a layout similar to a conventional keyboard, or a display of an image of a keyboard on a touch screen, which allows users to select the keys from the graphical display on the touch screen.

Some portable devices also provide voice-based user interfaces. For example, the user may use voice commands to dial a phone number on a cellular phone, or to submit a search request.

Some portable devices may switch between a landscape mode and a portrait mode for the display of content on a display screen, based on the orientation of the portable device. For example, when a user holds a cellular phone in a vertical direction, the portable device presents the content on the display screen in a portrait mode; and when the user holds the cellular phone in a horizontal direction, the portable device presents the content on the display screen in a landscape mode.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present disclosure provides systems and methods to facilitate voice-based search of information. For example, a portable device may be in a first orientation to present a display of a graphical user interface, such as a search interface presented within a web browser of the portable device. When the portable device is in a second orientation different from the first orientation, the portable device records a voice input for the graphical user interface. When the portable device is back to the first orientation, the portable device applies the voice input to the graphical user interface. When the user shakes the portable device, the portable device re-initializes the graphical user interface for a subsequent input.

In one embodiment, a portable device has a user interface to initiate and stop voice recognition. The portable device may be a cellular phone, such as an iPhone™ from Apple, Inc. When the user places the portable device close to an ear like talking on a phone, the portable device tips past vertical at some angle, which triggers the recording for voice recognition. When the user tips the portable device back to vertical, the portable device stops the recording. In one embodiment, a voice recognition engine recognizes the voice input from the recording; and the portable device applies the input on a search interface displayed on the portable device to obtain search results. In one embodiment, the user may shake the portable device to clear the search results to start a new search.

Figure 1:
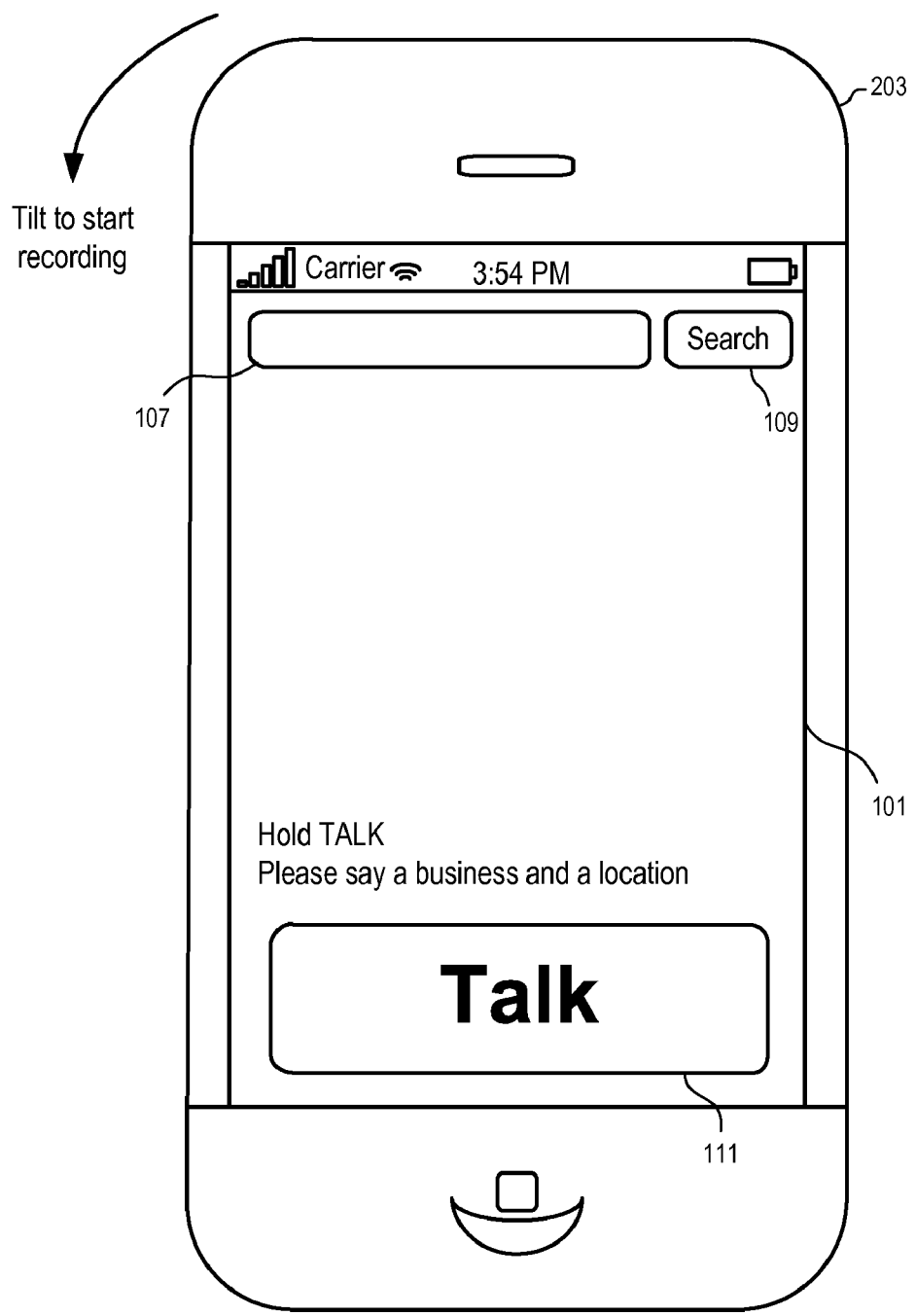
FIGS. 1 and 2 illustrate a method to start and stop a voice recorder on a portable device according to one embodiment.
Figure 2:
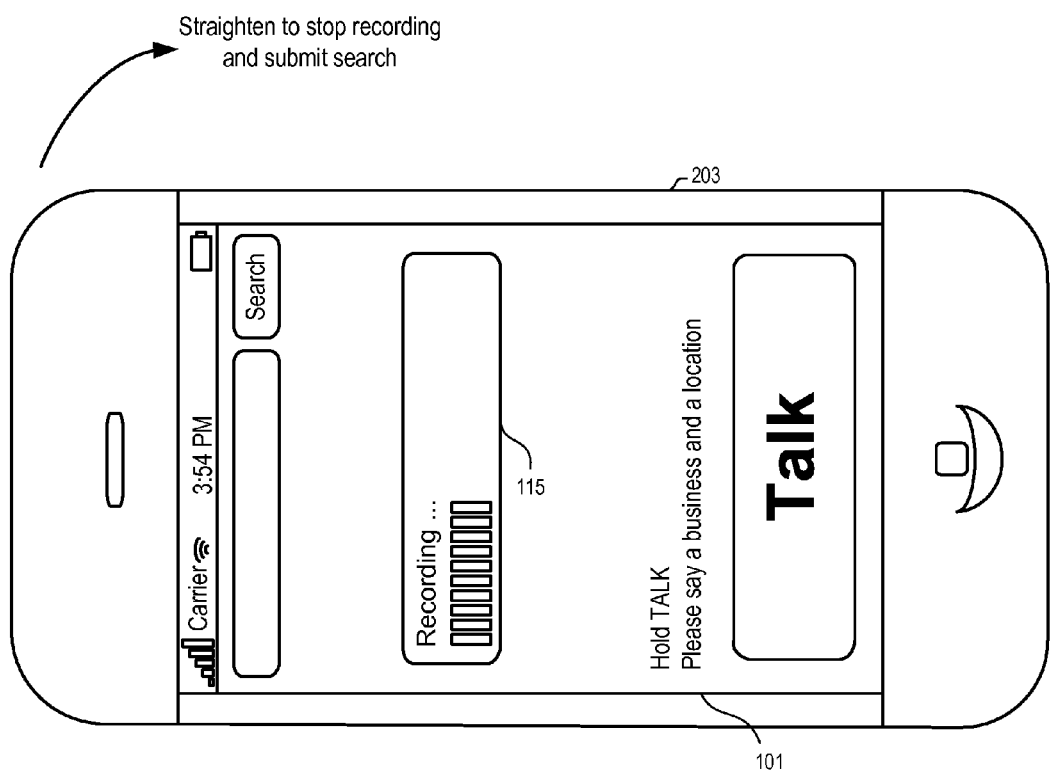

FIGS. 1 and 2 illustrate a method to start and stop a voice recorder on a portable device according to one embodiment.

In FIG. 1, the portable device (203) displays a graphical search interface in a display screen (101). The search interface includes an entry box (107) to receive search terms from the user, an icon button (109) labeled "search", and an icon button (111) labeled "talk".

The user may provide a search term in the entry box (107) via a keyboard, such as a touch screen keyboard, or an external keyboard attached to the portable device via a wired connection, or a wireless connection. Once the search term is in the entry box (107), the user may select the "search" button (109) to submit the search request.

Alternatively, the user may select the "talk" button (111) to provide the search term via voice input. For example, the user may hold the "talk" button (111) by pressing on a region on the touch screen (101) where the "talk" button (111) is displayed until the end of the voice input. The portable device (203) records sound using the microphone of the portable device (203) while the user holds the "talk" button (111). If the user speaks while holding the "talk" button (111), the recorded sound includes the voice input from the user. A voice recognition engine detects the voice input in the recorded sound; and the portable device (203) applies the input as search terms in the entry box (107).

In one embodiment, the voice recognition engine is integrated within the portable device. In another embodiment, the portable device transmits the recorded sound, which contains the voice input, to a remote server via a data communication channel. For example, the remote server uses a voice recognition engine to recognize the voice input and provides a text representation of the voice input to the portable device (203).

In one embodiment, the user can initiate and stop the voice recognition or voice recording by tilting the portable device (203). For example, when the user tilts the portable device (203) from the orientation illustrated in FIG. 1 to the orientation illustrated in FIG. 2, the portable device (203) starts voice recording to capture voice input. When the user straightens the portable device (203) back from the orientation illustrated in FIG. 2 to the orientation illustrated in FIG. 1, the portable device (203) stops voice recording to stop capturing of voice input.

In FIG. 2, while the portable device (203) is capturing voice input, the portable device (203) displays a progress bar (115) to indicate the progress of the recording.

In one embodiment, the tilting of the portable device (203) represents a hand gesture of the user who holds the portable device (203) in a hand. The portable device (203) can use an accelerometer to detect the tilting or hand gesture based on a change in relative directions between the axes of the portable device (203) and the direction of the gravity. In some embodiments, the portable device (203) can also detect other types of hand gestures based on the acceleration of the portable device (203) and/or the change of acceleration due to the hand gesture. For example, the user may make a hand gesture by shaking the portable device (203) to cause rapid changes in acceleration direction.

In one embodiment, the portable device (203) detects the hand gesture to activate the recording process for voice recognition under certain conditions, to avoid accidental activation of the recording process.

For example, in one embodiment, the portable device (203) activate the recording process when the portable device (203) detects the hand gesture while the touch screen (101) is of the portable device (203) is being touched. Thus, if the touch screen is not being touched, the detected hand gesture may be ignored. To activate the recording process, the user may touch on the touch screen, without touching at a specific user interface element, and make hand gestures.

For example, in one embodiment, the user may combine the hand gesture and a key input to activate the recording process. For example, the user may press a key and then make the hand gesture, or make the hand gesture while pressing the key, to request the portable device (203) to start the recording process for voice based input.

In one embodiment, the hand gesture causes the portable device (203) to activate the recording and/or voice recognition process if the hand gesture is within a predetermined period of time from a prior valid user interaction with the portable device (203), such as a selection of a menu item, text or voice input to an application, etc.

In one embodiment, a detected hand gesture is a valid input when the change occurs within a predetermined range of time period, which is indicative of the speed of the hand gesture. When the detected hand gesture is too slow or too faster, the portable device (203) may ignore the hand gesture.

FIG. 2 illustrates an example where the portable device (203) does not change orientation of displayed content relative to the display screen (101). Alternatively, the portable device (203) may switch from a portrait display mode to a landscape display mode after the user titles the portable device (203) to the orientation illustrated in FIG. 2.

Figure 3:
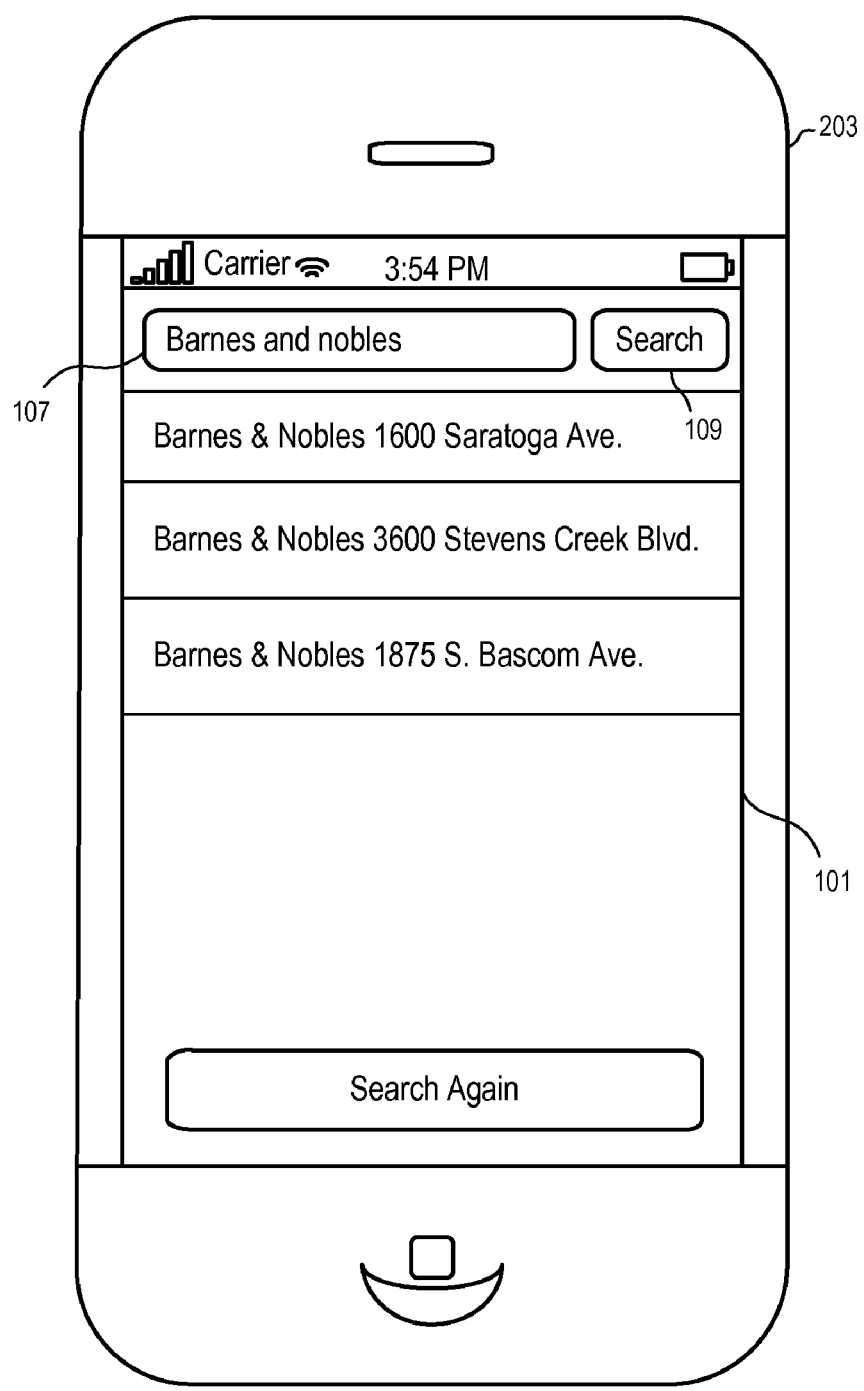
FIG. 3 illustrates a display of search results obtained via a recorded voice input according to one embodiment.

FIG. 3 illustrates a display of search results obtained via a recorded voice input according to one embodiment.

In one embodiment, after the user straightens the portable device (203) from the orientation illustrated in FIG. 2 to the orientation illustrated in FIG. 3, the voice recognition engine recognizes search terms from the voice input; and the portable device (203) displays the search terms in the entry box (107) for user confirmation. The user may optionally modify the search terms in the entry box (107) via a keyboard. The user can then select the "search" button (109) to submit a search request.

Alternatively, after the voice recognition engine recognizes the search terms from the voice input, the portable device (203) may apply the search terms to the entry box (107) and submit the search request without the user selecting the "search" button (109). The portable device (203) thus submits the search request in response to receiving the search terms from the voice recognition engine.

In one embodiment, after the user activates the voice recognition function for the search request, the portable device (203) may subsequently present certain user interfaces via voice. For example, when there is ambiguity in a search term, the portable device (203) may prompt the user via voice to resolve ambiguity. For example, the portable device (203) may present at least a portion of the search results via voice. For example, the portable device (203) may provide a voice menu to allow the user to interact with the search results via voice commands. The voice based user interfaces may be presented in addition to the graphical user interfaces, or as an alternative to the graphical user interfaces on the display screen (101) of the portable device (203).

Figure 4:
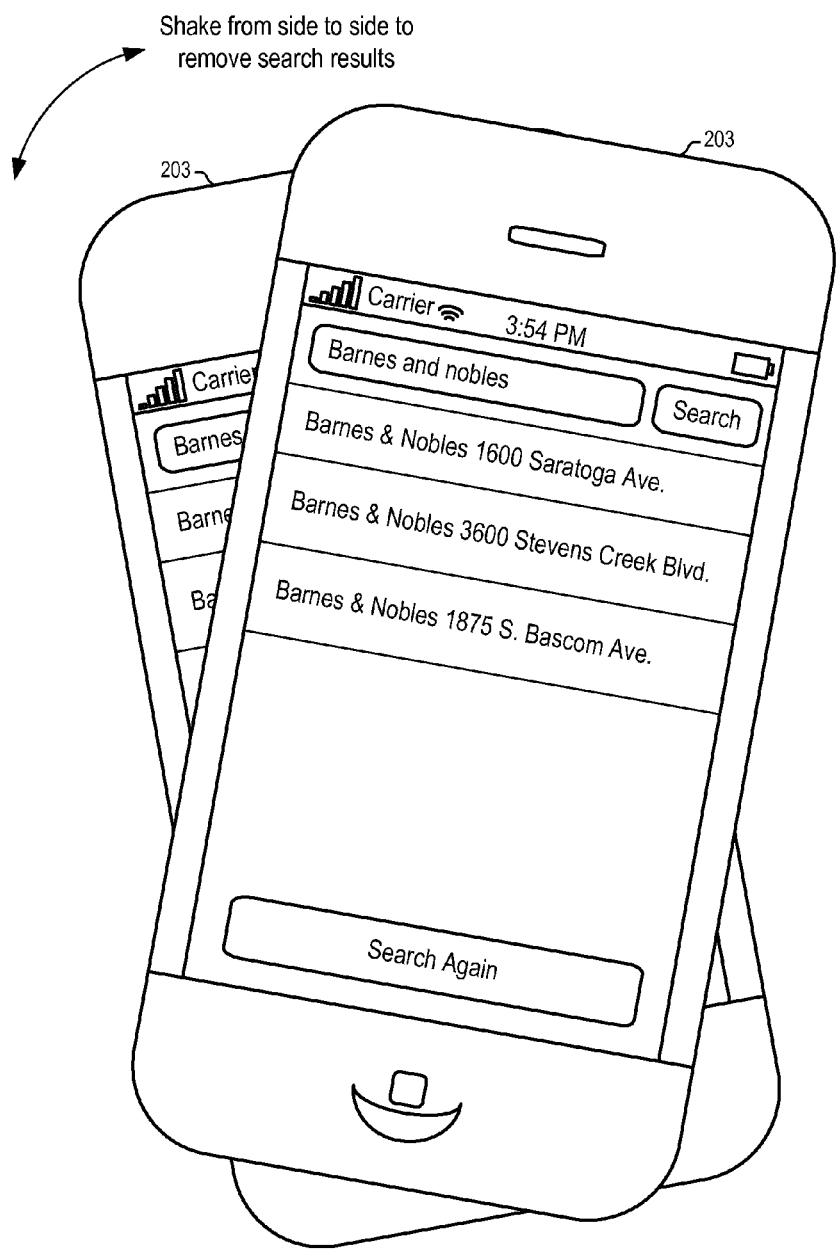
FIG. 4 illustrates a method to start a new search according to one embodiment.

FIG. 4 illustrates a method to start a new search according to one embodiment. FIG. 4 illustrates the shaking of the portable device (203). In response to the shaking of the portable device (203), the portable device re-initializes the search interface to a state as illustrated in FIG. 1. Thus, the shaking of the portable device (203) causes the portable device to erase the displayed search results and replace the search results with the search interface as illustrated in FIG. 1, for the formulation of the next search.

Figure 5:
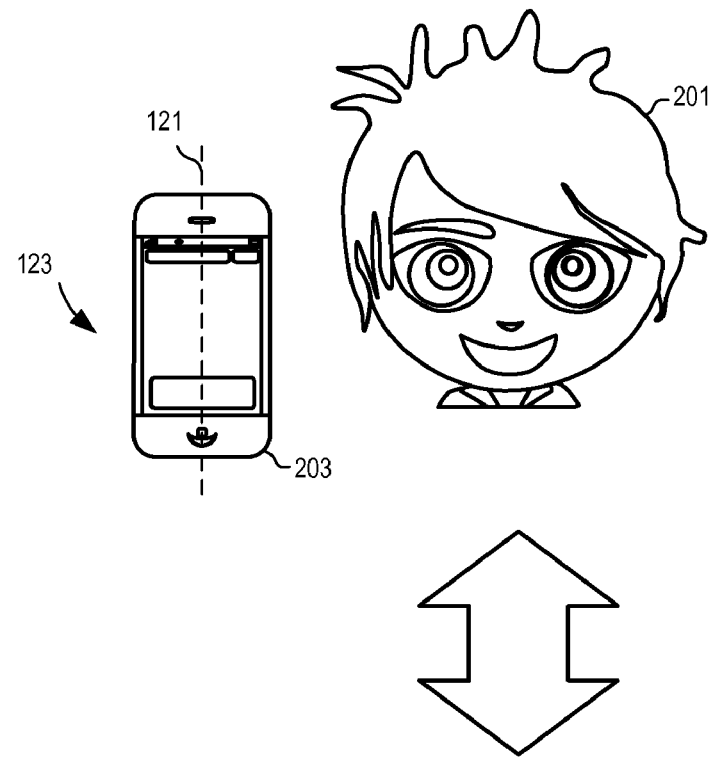
FIG. 5 illustrates the change in orientation of a portable device to provide voice input according to one embodiment.
Figure 5:
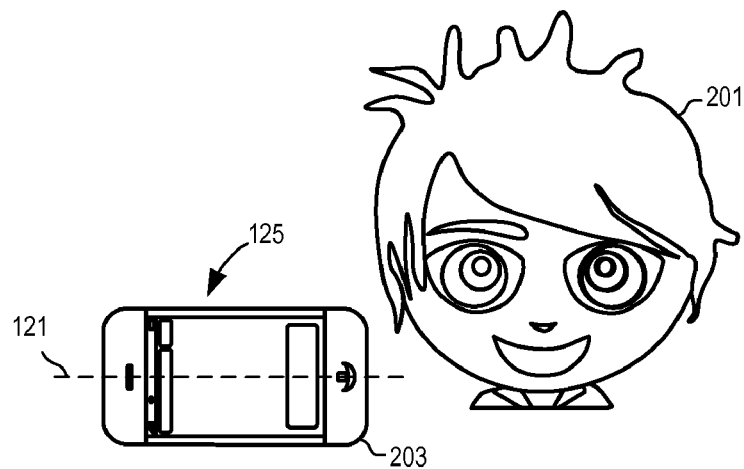

FIG. 5 illustrates the change in orientation of a portable device to provide voice input according to one embodiment. For example, when the portable device is in a first orientation (123), a longitudinal axis (121) of the portable device (203) is in a vertical position, pointing to the direction of gravity. When the portable device is in a second orientation (125), the longitudinal axis (121) of the portable device (203) is in a horizontal position, pointing to a direction perpendicular to the direction of the gravity.

In one embodiment, the first orientation (123) corresponds to a typical orientation of the portable device (203) that is used by the user (201) for viewing a graphical user interface displayed on the portable device (203) in front of the user (201); and the second orientation (125) corresponds to a typical orientation of the portable device (203) that is used by the user (201) for talking into the portable device (203).

In one embodiment, an accelerometer integrated within the portable device (203) measures the direction of gravity relative to the portable device (203) to determine the orientation of the portable device (203).

For example, when the direction of gravity measured by the accelerometer is substantially parallel to the axis (121), the portable device (203) determines that the user is currently holding the portable device (203) in the first orientation (123); when the direction of gravity is substantially perpendicular to the axis (121), the portable device (203) determines that the user is currently holding the portable device (203) in the second orientation (125).

For example, the portable device (203) may compute an angle between the direction of the gravity and the axis (121) of the portable device (203), based on the measurement of the accelerometer; when the angle is less than a first threshold (e.g., 15 degrees), the portable device (203) may conclude that the current orientation corresponds to the first orientation (123); and when the angle is more than a second threshold (e.g., 45 degrees or 60 degrees), the portable device (203) may conclude that the current orientation corresponds to the second orientation (125).

Figure 6:
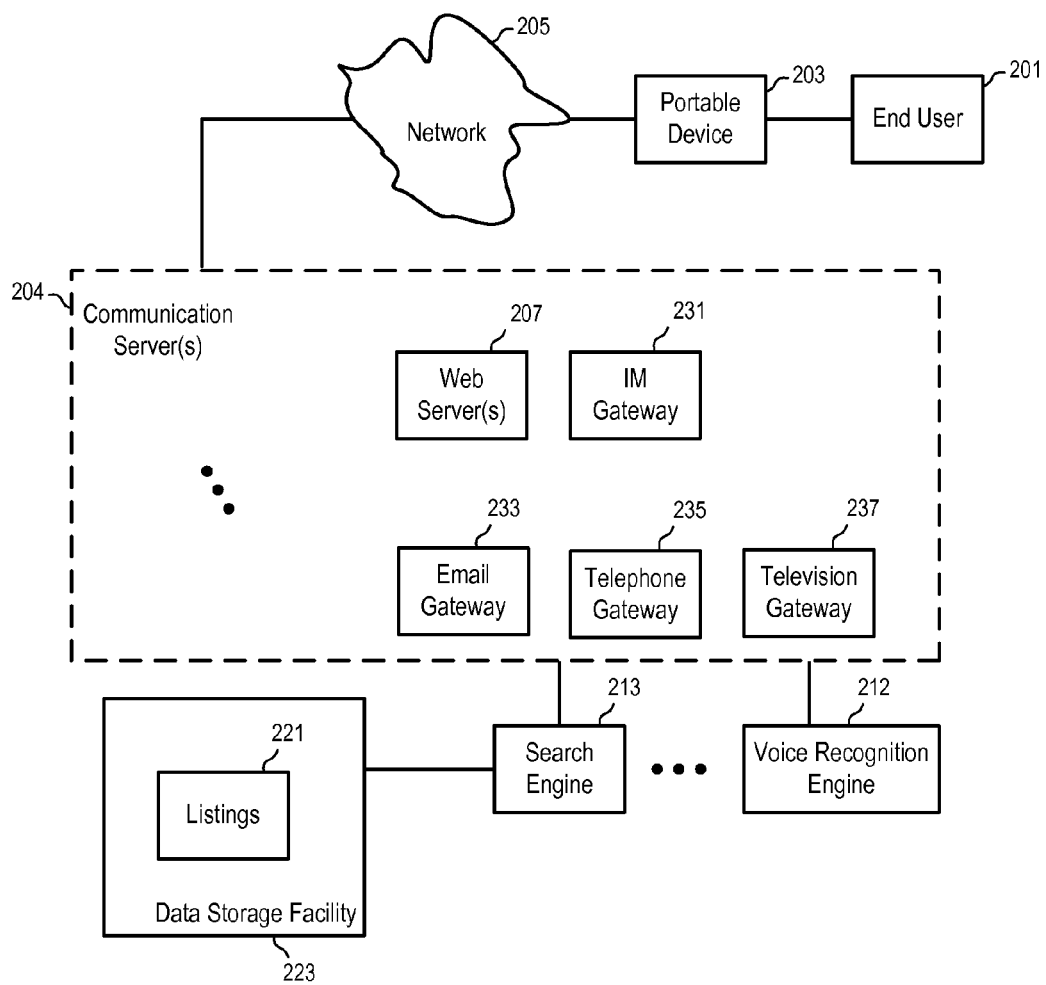
FIGS. 6 and 7 illustrate a system and method to perform a voice-based search according to one embodiment.

FIG. 6 illustrates a system to perform a voice-based search according to one embodiment.

In FIG. 6, an end user (201) may use a portable device (203) to submit a search request over the network (205) to a search engine (213) and/or to receive search results. The network (205) may include a local area network, a wireless data communication network, a telephone network, a cellular communication network, a telecommunication network, an interactive television network, a packet network, an Internet Protocol Television (IPTV) network, an intranet, or a combination of networks, such as Internet.

The portable device (203) may access the search engine (213) via communication servers (204), such as a web server (207), an instant messaging (IM) gateway (231), an email gateway (233), a telephone gateway (235), or a television gateway (237), or other types of servers, such as an application gateway to interface different servers. Some embodiments may use one type of communication servers (204) to receive the search request from the portable device (203) and other types of communication servers (204) to provide the search results to the same portable device (203) or a different portable device (203). Some embodiments may use different types of communication servers (204) to service different types of portable devices (203).

In one embodiment, the web server (207) communicates with the portable device (203), via HyperText Transfer Protocol (HTTP) and/or other types of communication protocols, such as File Transfer Protocol (FTP), Wireless Application Protocol (WAP), etc. The web server (207) may provide static web pages, dynamic web pages, and/or web services.

In some embodiments, the web server (207) provides web applications to the portable device (203) for execution in a web browser running on the portable device (203); and the web applications may include scripts, such as Java, JavaScript, etc., for execution within an isolated environment in a browser.

In some embodiments, the web server (207) may provide rich-client applications to the portable device (203); and the rich-client application may be programmed in traditional programming languages, such as C/C++, to have full access to functions of the operating system running on the portable device (203).

The communication server (204) may communicate with a search engine (213) to process the search request and present search results based on the information stored in a data storage facility (223), such as listings (221) of businesses, events, maps, landmarks, parks, web pages, etc.

In one embodiment, the portable device (203) submits recorded sound to the voice recognition engine (212) over a data communication channel, such as the network (205), to obtain the text corresponding to the voice input recognized by the voice recognition engine (212). The portable device (203) may stream the recorded sound to the voice recognition engine (212) while the portable device (203) is recording. Alternatively, the portable device (203) may store the recorded sound at in its memory and then transmit the recorded sound to the voice recognition engine (212) (e.g., when the connection and/or bandwidth to the voice recognition engine (212) becomes available).

Alternatively, a voice recognition engine (212) is part of the portable device (203).

In one embodiment, the voice recognition engine (212) directly provides the text to the search engine (213) as the search terms. Alternatively, the voice recognition engine (212) provides the text to the portable device (203) to allow the end user (201) to confirm and/or modify the search terms. The portable device (203) may access the search engine (213) and the voice recognition engine (212) via the same communication server (204), or separate communication servers (204).

The communication servers (204), the search engine (213) and the voice recognition engine (212) may run on same or separate computers. In one embodiment, there may be one or more layers of application servers between the web server (207) and the data storage facility (223) to process the business logic and data access of the rich-client applications. Alternatively, application servers may be integrated with the web servers (207) and/or the communication gateways, such as the IM gateway (231), email gateway (233), telephone gateway (235), television gateway (237), etc. Thus, the disclosure is not limited to particular types of connections among the communication servers (204), the search engine (213), the voice recognition engine (212), the data storage facility (223) and other modules not shown in FIG. 6.

In one embodiment, listings (221) of businesses, such as restaurants, car dealers, retailers, service providers, gas stations, parking lots, plumbers, and the like, may have street addresses or other location parameters, such as longitude and latitude coordinates, stored as locations (219) in the data storage facility (223). The listings (221) may include addresses, telephone numbers, advertisements, announcements, and/or events, etc.

In some embodiments, the web server (207) provides listings (221) as a directory service; and the end user (201) can search for particular types of listings (221) via the search engine (213). In one embodiment, the web server (207) provides listings (221) as advertisements, together with other types of information, such as blog entries, publications, news articles, review articles, etc.

In one embodiment, one computer system implements the web servers (207), the search engine (213), and the voice recognition engine (212). Alternatively, different processes running on one or more shared computers may implement some of the components (207, 213, and 212). For example, one computing module, thread, or process may implement multiple of the components (204, 213 and 212). In some embodiments, special purpose data processing systems implement the one or more of the components (204, 213, and 212), such as using Application-Specific Integrated Circuit (ASIC) or Field-Programmable Gate Array (FPGA). In some embodiments, processes running according to software instructions on general purpose data processing systems, such as general purpose personal computers or server computers, can implement the components (204, 213, and 212). Thus, the implementations are not limited to hardware, software, or particular combinations of hardware and software.

Different embodiments may implement the data storage facility (223) in different ways. For example, one or more data processing systems may store the information about the listings (221). For example, the data storage facility (223) may include one or more relational or object oriented databases, or flat files on one or more computers or networked storage devices, etc. The data storage facility (223) may be a centralized system, or include a distributed system, such as a peer to peer network, or Internet.

Figure 7:
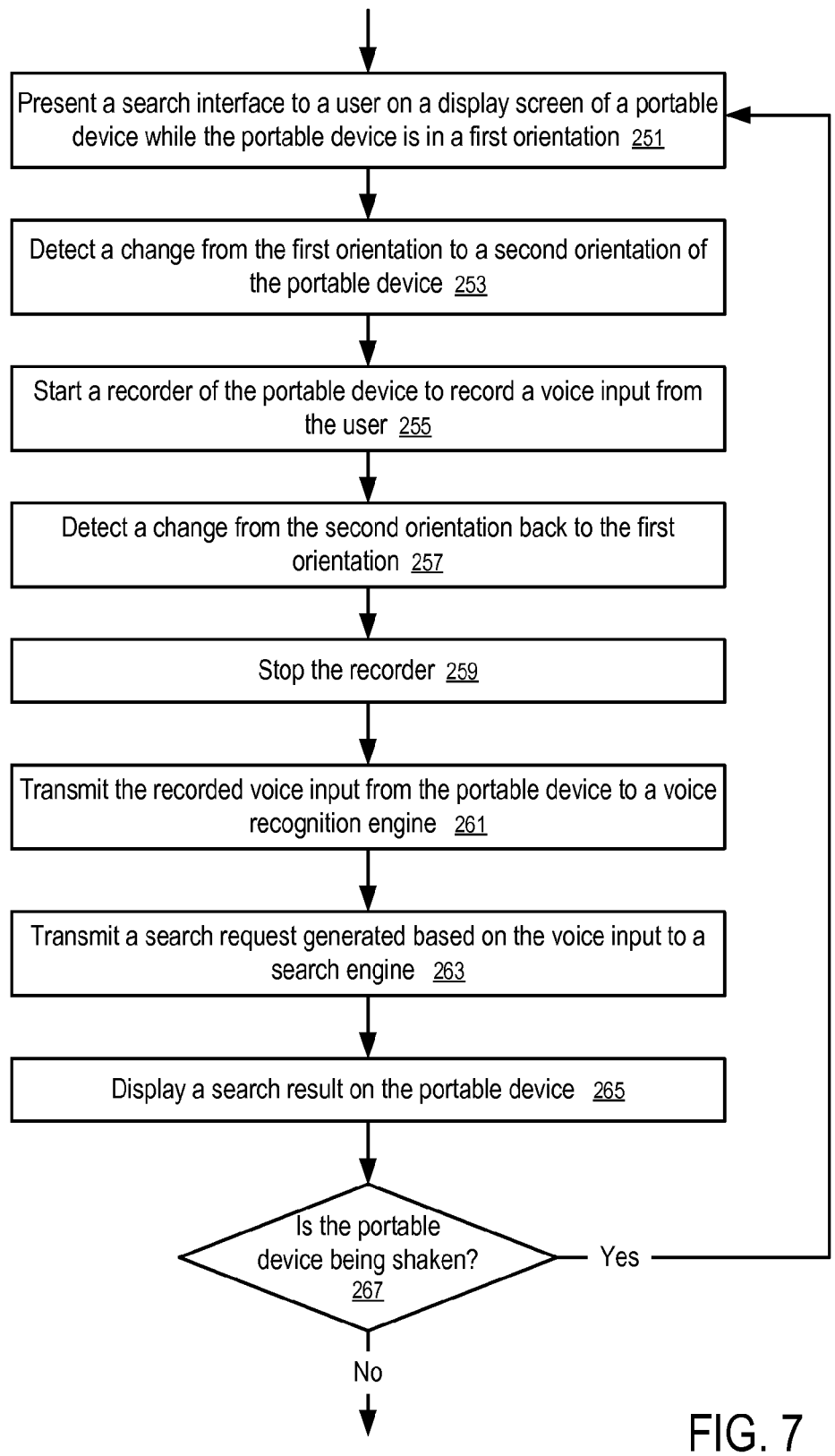

FIG. 7 illustrates a method to perform a voice-based search according to one embodiment. In FIG. 7, the portable device (203) presents (251) a search interface to the user (201) on a display screen (101) of the portable device (203) while the portable device (203) is in a first orientation (123). In response to detecting (253) a change from the first orientation (123) to a second orientation (125) of the portable device (203), the portable device (203) starts (255) a recorder of the portable device (203) to record a voice input from the user (201).

Subsequently, in response to detecting (257) a change from the second orientation (125) back to the first orientation (123), the portable device (203) stops (259) the recorder.

The portable device (203) then transmits (261) the recorded voice input from the portable device (203) to a voice recognition engine (212) and transmits (263) a search request generated based on the voice input to the search engine (213). After receiving the search results from the search engine (213), the portable device (203) displays (265) a search result on its display screen (101).

In one embodiment, the portable device (203) uses its accelerometer to determine whether the user is shaking the portable device (203). The accelerometer measures the acceleration of the portable device (203). When the acceleration having a magnitude above a threshold changes from one direction to an opposite direction within a threshold period of time, the portable device (203) concludes that the user is shaking the portable device (203).

In one embodiment, the user may shake the portable device (203) by moving the portable device (203) from side to side, or by rotating the portable device (203) back and forth, to return the user interface to a state for accepting input for the new search.

In one embodiment, the portable device (203) of the end user (201) is a data processing system, such as a personal digital assistant (PDA), a mobile phone, a cellular phone, a landline phone, a portable television set, a game controller, microprocessor-based or programmable consumer electronics, and the like.

In one embodiment, the portable device (203) includes a web browser which allows the end user (201) to submit a search request to one of the web servers (207) for location dependent information, such as a listing (221) of businesses or people, such as restaurants, car dealers, retailer locations, service providers, gas stations, parking lots, plumbers, and the like. Alternatively, the portable device (203) may provide the search request via other data communication channels, such as email, short message service (SMS), instant messaging (IM), telephone connection, etc. For example, the portable device (203) may provide the search request to an email gateway (233) via email, or to an IM gateway (231) via instant messaging, or to a telephone gateway (235) via a telephone call, or to a television gateway (237) via an interactive television system. Some embodiments may use other types of gateways not shown in FIG. 6, such as gateways for SMS. Thus, the disclosure is not limited to the examples or combinations illustrated in FIG. 6.

In some embodiments, the end user (201) may use one portable device (203) to submit the search request and another portable device (203) to receive the search results. The different portable devices (203) are associated with each other and may be considered as a combined portable device (203). For example, the user (201) may submit the search request via an SMS message through one portable device (203), and receive the search results at another portable device (203) via email. For example, the user may submit the search request via voice through one portable device (203) and receive the search results via a web page at another portable device (203) or at the same portable device (203). For example, in one embodiment, the user (201) may use a mobile phone as the portable device (203) to transmit voice information, via a data connection through the network (205) and the web server (207) (via email gateway (231), or IM gateway (233), or other data communication gateways), or a telephone connection through a telephone gateway (235), to a voice recognition system (212) to formulate a search and to receive a web page or email at the same portable device (203) or at another portable device (203) that shows the results of the search.

Figure 8:
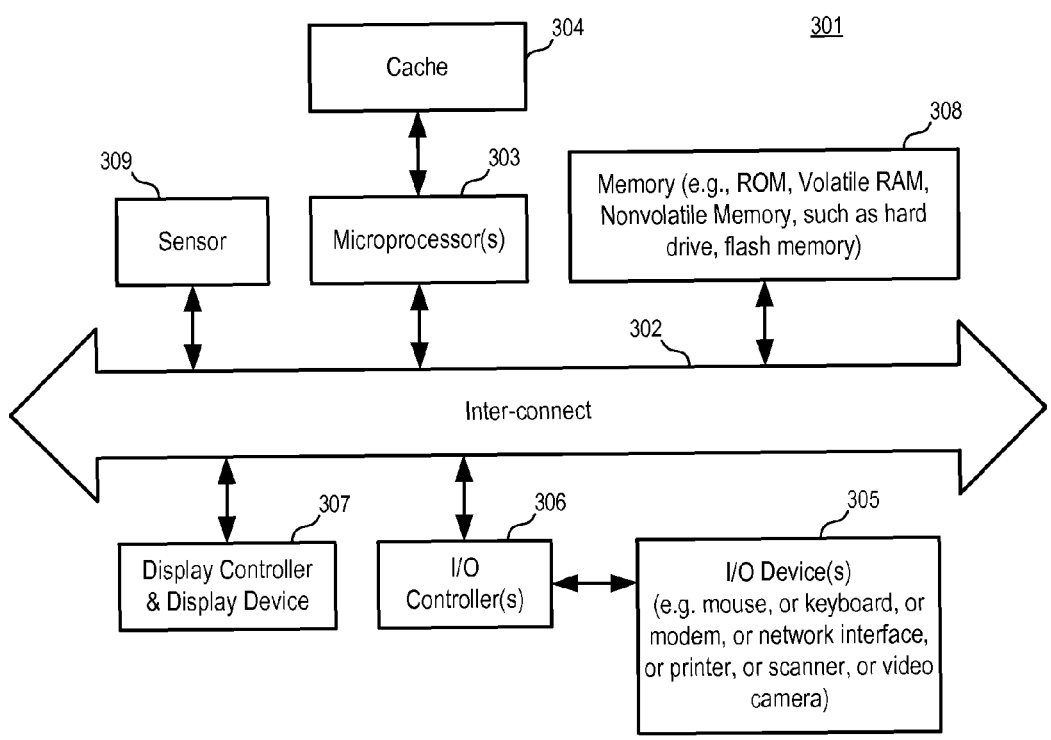
FIG. 8 illustrates a portable device according to one embodiment.

FIG. 8 illustrates a portable device (203) according to one embodiment. While FIG. 8 illustrates various components of a computer system, it is not intended to represent any particular architecture or manner of interconnecting the components. Some embodiments may use other systems that have fewer or more components than those shown in FIG. 8.

In FIG. 8, the data processing system (301) of the portable device (203) includes an inter-connect (302) (e.g., bus and system core logic), which interconnects a microprocessor(s) (303) and memory (308). The microprocessor (303) is coupled to cache memory (304) in the example of FIG. 8.

The inter-connect (302) interconnects the microprocessor(s) (303) and the memory (308) together and also interconnects them to a display controller, display device (307), the sensor (309) and to peripheral devices such as input/output (I/O) devices (305) through an input/output controller(s) (306).

The sensor (309) may include an accelerometer to determine the orientation of the portable device (203) and/or to detect the shaking of the portable device (203).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs". The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A portable device, comprising:
a computing device configured to detect a first change in orientation of the portable device;
wherein the computing device is configured to record a voice input from the user in response to the detection of the first change in orientation of the portable device;
wherein the computing device is configured to detect a second change in orientation of the portable device;
wherein the computing device is configured to stop recording in response to the detection of the second change in orientation of the portable device;
wherein the computing device is configured to submit the voice input from the portable device to a first server over a data communication channel;
wherein the computing device is configured to receive text recognized from the voice input from the first server;
wherein the computing device is configured to submit a search request generated based on the text from the portable device to a second server over the data communication channel;
wherein the computing device is configured to receive a search result responsive to the search request from the second server; and
wherein the computing device is configured to display the search result on the portable device.

2. A method comprising:
detecting, via a computing device, a first change in orientation of a portable device;
in response to detection of the first change in orientation of the portable device, recording, via the computing device, a voice input from the user;
detecting, via the computing device, a second change in orientation of the portable device;
in response to detection of the second change in orientation of the portable device, stopping, via the computing device, the recording;
submitting, via the computing device, the voice input from the portable device to a first server over a data communication channel;
receiving, via the computing device, text recognized from the voice input from the first server;
submitting, via the computing device, a search request generated based on the text from the portable device to a second server over the data communication channel;
receiving, via the computing device, a search result responsive to the search request from the second server; and displaying, via the computing device, the search result on the portable device.

3. The method of claim 2, wherein the first and second changes in orientation of the portable device are detected using an accelerometer integrated in the portable device.

4. The method of claim 3, further comprising:
measuring a direction of gravity relative to the portable device to determine an orientation of the portable device.

5. The method of claim 2, further comprising:
submitting, via the computing device, a search request from the portable device to retrieve a search result in response to the detection of the second change in orientation of the portable device, the search request being based on content of the voice input; and
displaying the search result on the portable device.

6. The method of claim 5, wherein the first change in orientation of the portable device includes tilting the portable device from a first position to a second position; and the second change in orientation of the portable device includes moving the portable device from the second position back to the first position.

7. The method of claim 6, wherein in the first position a longitudinal axis of the portable device points to a direction of the force of gravity; and in the second position the longitudinal axis of the portable device points to a direction generally perpendicular to the direction of the force of gravity.

8. The method of claim 5, wherein the portable device comprises a cellular phone having a display screen; the first change in orientation of the portable device includes changing from a first position to view the display screen in front of a user to a second position to talk on the cellular phone; and the second change in orientation of the portable device includes changing from the second position back to the first position.

9. The method of claim 5, further comprising:
detecting, via the computing device, a shaking of the portable device after the search result is displayed on the portable device;
in response to detecting the shaking of the portable device, removing, via the computing device, a display of the search result from the portable device.

10. The method of claim 5, further comprising:
detecting, via the computing device, a shaking of the portable device after the search result is displayed on the portable device; and
in response to detecting the first change in orientation of the portable device, after detecting the shaking of the portable device, recording, via the computing device, a second voice input from the user.

11. The method of claim 5, wherein shaking of the portable device comprises shaking the portable device from side to side.

12. The method of claim 2, further comprising:
streaming, via the computing device, the voice input from the portable device to a server over a data communication channel to formulate a search request;
prompting, via the computing device, the user using voice for the search request; and
receiving, via the computing device, a search result from the server for the search request.

13. The method of claim 2, wherein the search result comprises a list of businesses.

14. The method of claim 13, wherein the list of businesses includes telephone numbers of the businesses.

15. A tangible machine readable medium storing instructions that, when executed by a computing device, embedded in a portable device, cause the computing device to perform a method, the method comprising:
detecting a first change in orientation of the portable device;
in response to detection of the first change in orientation of the portable device, recording a voice input from the user;
detecting a second change in orientation of the portable device;
in response to detection of the second change in orientation of the portable device, stopping the recording;
submitting the voice input from the portable device to a first server over a data communication channel;
receiving text recognized from the voice input from the first server;
submitting a search request generated based on the text from the portable device to a second server over the data communication channel;
receiving a search result responsive to the search request from the second server; and
displaying the search result on the portable device.

* * * * *